(12) United States Patent
Xiong

(10) Patent No.: US 10,822,037 B2
(45) Date of Patent: Nov. 3, 2020

(54) FRAME STRUCTURE FOR OFF ROAD VEHICLE

(71) Applicant: Zhejiang CFMOTO Power Co., Ltd., Hangzhou, Zhejiang (CN)

(72) Inventor: Xiaoming Xiong, Hangzhou (CN)

(73) Assignee: Zhejiang CFMOTO Power Co., Ltd., Hangzhou, Zhejiang (CN)

( * ) Notice: Subject to any disclaimer, the term of this patent is extended or adjusted under 35 U.S.C. 154(b) by 110 days.

(21) Appl. No.: 16/191,994

(22) Filed: Nov. 15, 2018

(65) Prior Publication Data

US 2019/0144040 A1  May 16, 2019

(30) Foreign Application Priority Data

Nov. 15, 2017 (CN) .......................... 2017 1 1128155
Nov. 15, 2017 (CN) ...................... 2017 2 1521412 U
Nov. 15, 2017 (CN) ...................... 2017 2 1522359 U
Nov. 15, 2017 (CN) ...................... 2017 2 1526284 U

(51) Int. Cl.
*B62D 21/18* (2006.01)
*B60G 7/00* (2006.01)
(Continued)

(52) U.S. Cl.
CPC ............. *B62D 21/183* (2013.01); *B60G 3/14* (2013.01); *B60G 3/202* (2013.01); *B60G 7/008* (2013.01); *B60G 7/02* (2013.01); *B60G 15/062* (2013.01); *B60G 7/006* (2013.01); *B60G 13/003* (2013.01); *B60G 2200/1442* (2013.01); *B60G 2200/182* (2013.01); *B60G 2202/312* (2013.01); *B60G 2204/128* (2013.01); *B60G 2204/129* (2013.01); *B60G 2204/143* (2013.01); *B60G 2300/07* (2013.01); *B60Y 2200/124* (2013.01); *B62D 21/11* (2013.01)

(58) Field of Classification Search
CPC ........ B62D 21/183; B60G 7/02; B60G 3/202; B60G 3/14; B60G 7/008; B60G 2200/182; B60G 2300/07; B60G 2200/1442; B60G 2204/128; B60G 13/003; B60G 7/006; B60G 2204/143; B60Y 2200/124
See application file for complete search history.

(56) References Cited

U.S. PATENT DOCUMENTS 3,149,690 A  9/1964 Rosenkrands et al.
6,851,691 B2  2/2005 Rasidescu et al.
(Continued)

*Primary Examiner* — Karen Beck
(74) *Attorney, Agent, or Firm* — Jeffrey D. Shewchuk; Shewchuk IP Services, LLC

(57) ABSTRACT

A frame for an off road vehicle includes main beams establishing a base plane. Mounting beams, which can be used to support forces from the swing arm of a rear suspension, are spaced outside the main beams and within the base plane, running longitudinally in line with the swing arms of the rear suspension. Right and left longitudinal beams start within the base plane, but rise to their trailing ends so as to not interfere with the suspension travel of the swing arms as they extend back inward over the swing arms. Front and rear support columns can further attach into, secure and support the mounting beams and the longitudinal beams. All of the beams and columns can be formed by cutting cylindrical tubing to length and then curving the cylindrical tubing, each piece within a single plane.

20 Claims, 7 Drawing Sheets

(51) Int. Cl.
*B60G 3/14* (2006.01)
*B60G 15/06* (2006.01)
*B60G 7/02* (2006.01)
*B60G 3/20* (2006.01)
B60G 13/00 (2006.01)
B62D 21/11 (2006.01)

(56) References Cited

U.S. PATENT DOCUMENTS

| | | |
|---|---|---|
| 7,401,797 B2 | 7/2008 | Cho |
| 7,650,959 B2 | 1/2010 | Kato et al. |
| 7,931,106 B1 | 4/2011 | Suzuki et al. |
| 8,746,719 B2 | 6/2014 | Safranski et al. |
| 9,102,205 B2 | 8/2015 | Kvien et al. |
| 9,365,251 B2 | 6/2016 | Safranski et al. |
| 9,434,244 B2 | 9/2016 | Sunsdahl et al. |
| 9,650,078 B2 | 5/2017 | Kinsman et al. |
| 9,663,145 B2 | 5/2017 | Schroeder et al. |
| 9,771,112 B2 | 9/2017 | Spindler et al. |
| 9,932,073 B2 | 4/2018 | Dube et al. |
| 9,969,259 B2 | 5/2018 | Safranski et al. |
| 2012/0223500 A1* | 9/2012 | Kinsman ............... B60G 7/02 280/124.153 |
| 2015/0014974 A1 | 1/2015 | Cotnoir et al. |
| 2016/0176287 A1* | 6/2016 | Ripley ................. B60K 17/08 180/365 |
| 2016/0347137 A1* | 12/2016 | Despres-Nadeau ...... B60G 3/20 |
| 2018/0065465 A1* | 3/2018 | Ward ..................... B60K 17/34 |
| 2018/0072348 A1* | 3/2018 | Hisada ................ B60K 17/348 |
| 2019/0144040 A1* | 5/2019 | Xiong ................. B62D 21/183 180/312 |
| 2020/0130450 A1* | 4/2020 | Nakashima .......... B60G 15/068 |

\* cited by examiner

FRAME STRUCTURE FOR OFF ROAD VEHICLE

CROSS-REFERENCE TO RELATED U.S. APPLICATION(S)

None.

FIELD OF THE INVENTION

The present invention relates to off-road vehicles such as UVs and ATVs, and more particularly to the construction and layout of the frame in such off-road vehicles.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

UVs and ATVs commonly include a frame structure made of a number of bars or tubes. Some of the bars or tubes may be entirely linear, while other bars or tubes may be curved or bent into desired shapes. Different plate structures may also form parts of the frame. The bars or tubes and any plates can be welded or fastened together such as with bolts, providing a rigid support structure upon which the engine, seats, controls and other components are mounted and supported.

For instance, FIGS. 1 and 2 show one prior art frame structure 20, that used on the Z8 or ZFORCE off road vehicle marketed by the assignee of the present invention, Zhejiang CFMOTO Power Co., Ltd., for use with a driver and a passenger in a side-by-side configuration. As shown in FIG. 1, a significant portion of the frame 20 defines a generally horizontal base plane 22 of the frame 20 of the vehicle, extending generally from front wheels (not shown) at left to rear wheels (not shown) at right. As well known in the art, a roll cage or roll over protection system ("ROPS") (not shown) attaches in to the frame 20 and extends at an elevation above the driver's and passenger's heads, but can be viewed as separate from the main frame structure 20 shown in FIGS. 1 and 2.

At the longitudinal location of the driver's and passenger's feet, there is no structure (excluding the ROPS, which is not considered part of the frame) in the frame 20 higher than the horizontal base plane 22, best seen in FIG. 1. Instead, the horizontal base plane 22 is primarily made up of two main beams 10 and two wider long beams 1 all of which extend longitudinally, connected by a series of cross plates or cross beams extending transversely. Under the occupant compartment, the main beams 10 are fairly widely spaced as shown in FIG. 2, such as having spacing which is half of the width of the frame 20 or more, in this case having a spacing of about 60% of the width of the frame 20 (whenever "width" proportions are recited herein, the measurement is from the outside of the tubes or bars). The horizontal, transverse spacing between each of the main beams 10 and its adjacent long beam 1 is much tighter, such as about 20% of the width of the frame 20. With this tight spacing, the long beams 1 may be formed of smaller diameter or thinner tubing than the main beams 10, best seen in FIG. 1.

Forward of the front dashboard (not shown), there is a front section 26 of the frame 20 higher than the horizontal base plane 22 that includes several columns 34 extending substantially vertically and then over a front portion of the vehicle. Additional portions 48 of the frame 20 may extend under, between or just behind the occupant seats, such as for mounting of a parking brake (not shown) and engine (not shown), and to provide lateral stability. Behind the passengers, there is a significant rear section 30 of the frame 20 higher than the horizontal base plane 22, including right and left horizontal longitudinally extending high beams 6. Various rear uprights 4, 5 are used to attach the high beams 6 to the horizontal base plane 22, which can extend further higher to provide rear attachment points 38 for the ROPS. The terms "column" and "uprights" as used herein are not intended to require any structural similarity or difference to the material used for the beams, but rather to indicate that the columns or uprights generally extend vertically rather than horizontally.

FIGS. 1 and 2 also show where the rear suspension mechanism 24 anchors in to the frame structure 20. Rear shock absorbers 28 anchor in relatively high on the rear frame 30, such as in to the right and left high beams 6. Rear pivot or control rods 32 anchor in relatively low on the rear frame 30 such as in to the right and left main beams 10 or extension of the main beams 10 as part of the horizontal base plane 22.

Other exemplary prior art frame structures include those taught in U.S. Pat. Nos. 7,650,959, 7,931,106, 9,102,205, 9,434,244, 9,650,078 9,663,145, 9,771,112 and 9,932,073, as well as in U.S. Pat. Pub. No. 2015/0014974, all incorporated by reference. However, in general terms, such prior art frame structures exhibit similar features to those discussed above with reference to FIGS. 1 and 2.

UVs and ATVs are designed for travel over rough, off-road surfaces with considerable jarring and bumping during use, transmitting significant bending moments from one side (front, back, left or right) to the other. The welding or other attachment mechanisms for the frame must be of high quality and high strength to support and transmit the substantial forces and loads. Particularly due to the off-road nature of UVs and ATVs, often such vehicles allow a significantly greater amount of suspension travel than on-road vehicles. The frame structure of UVs and ATVs must accordingly permit the amount of suspension travel needed without interference. Improvements to frame structures are needed.

BRIEF SUMMARY OF THE INVENTION

The present invention is a frame for an off road vehicle, particularly beneficial for use with swing arm rear suspensions, as well an off road vehicle using such a frame and swing arm rear suspension. The frame includes main beams establishing a base plane, as well as mounting beams spaced outside the main beams and running longitudinally in line with the swing arms of the rear suspension and within the base plane. The right and left longitudinal beams start within the base plane, but rise to their trailing ends so as to not interfere with the suspension travel of the swing arms as they extend back inward over the swing arms. The frame construction allows for a stronger frame which better supports the thrust and drag forces of the rear wheels, while allowing for easier assembly and welding

Figure 1:
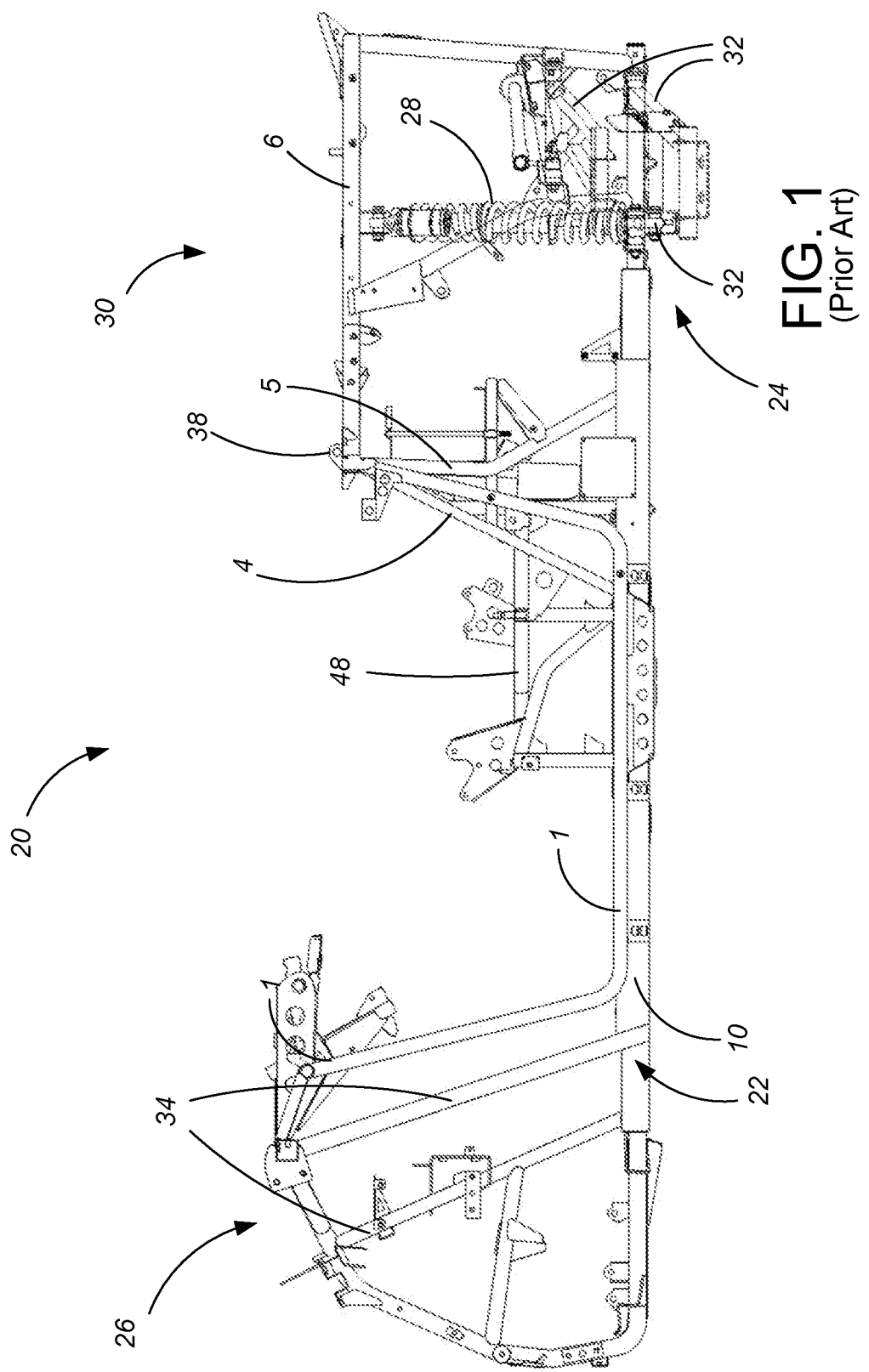
FIG. 1 is a side view of a prior art frame structure, also showing the rear suspension structure.
Figure 2:
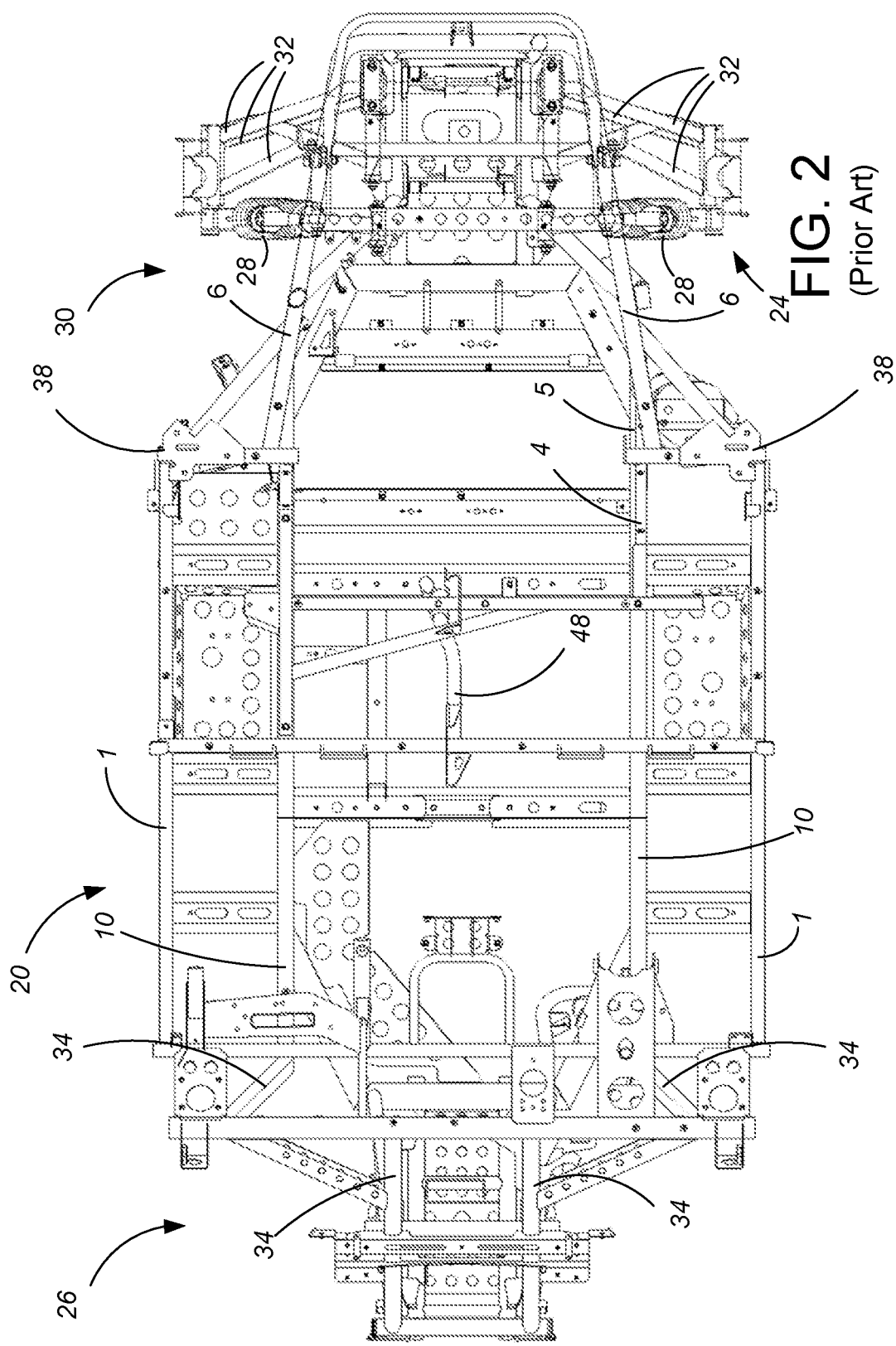
FIG. 2 is a top plan view of the prior art frame structure and rear suspension structure of FIG. 1.
Figure 3:
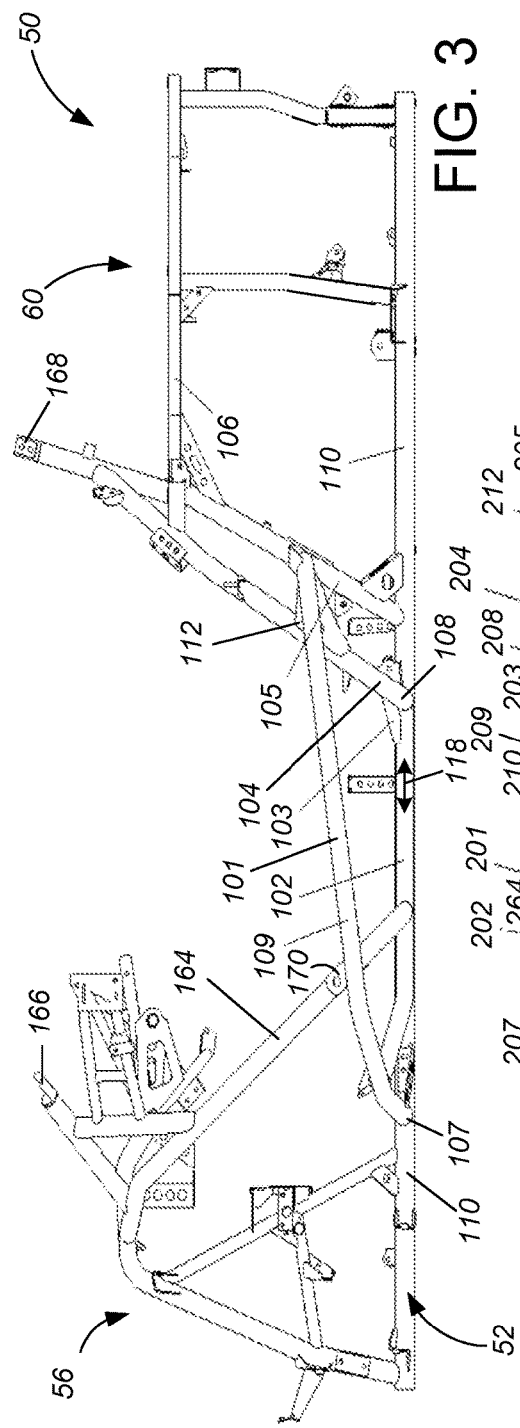
FIG. 3 is a side view of a preferred embodiment of the frame structure of the present invention, with the seat support portion and engine mount portion removed for clarity.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

A preferred embodiment of the frame 50 of the present invention is shown in FIGS. 3-8. Like the prior art, the frame 50 establishes a horizontal base plane 52 which primarily includes a left main beam 110 and a right main beam 210, both extending primarily longitudinally Like the prior art, the main beams 110, 210 are both formed from hollow metal tubing, such as cylindrical or rectangular hollow metal tubing, though other shapes, such as I-beam shapes or having one or more flats or indentations running longitudinally, could alternatively be used. As another alternative, the main beams 110, 210 could alternatively be replaced by a single monolithic main beam, tube or plate structure running substantially the length of the vehicle. Being formed of cylindrical hollow metal tubing, the main beams 110, 210 can be easily cut to length and bent from hollow tube stock into the configuration shown.

Like the prior art, the left main beam 110 and the right main beam 210 are connected together with a series of cross plates or cross beams extending transversely between the left main beam 110 and the right main beam 210. The number and spacing of the cross plates or cross beams is not significant to the present invention, and therefore as depicted does not differ much from the prior art. Instead, the number and spacing of the cross plates or cross beams can be selected by the frame designer as needed for the required stress profile of the frame 50 as a whole. Any or all of the cross plates may include one or more holes, reducing the weight of the cross plates while still providing adequate stiffness. The holes through the cross plates can also assist in mounting other components (not shown) to the frame 50.

Figure 4:
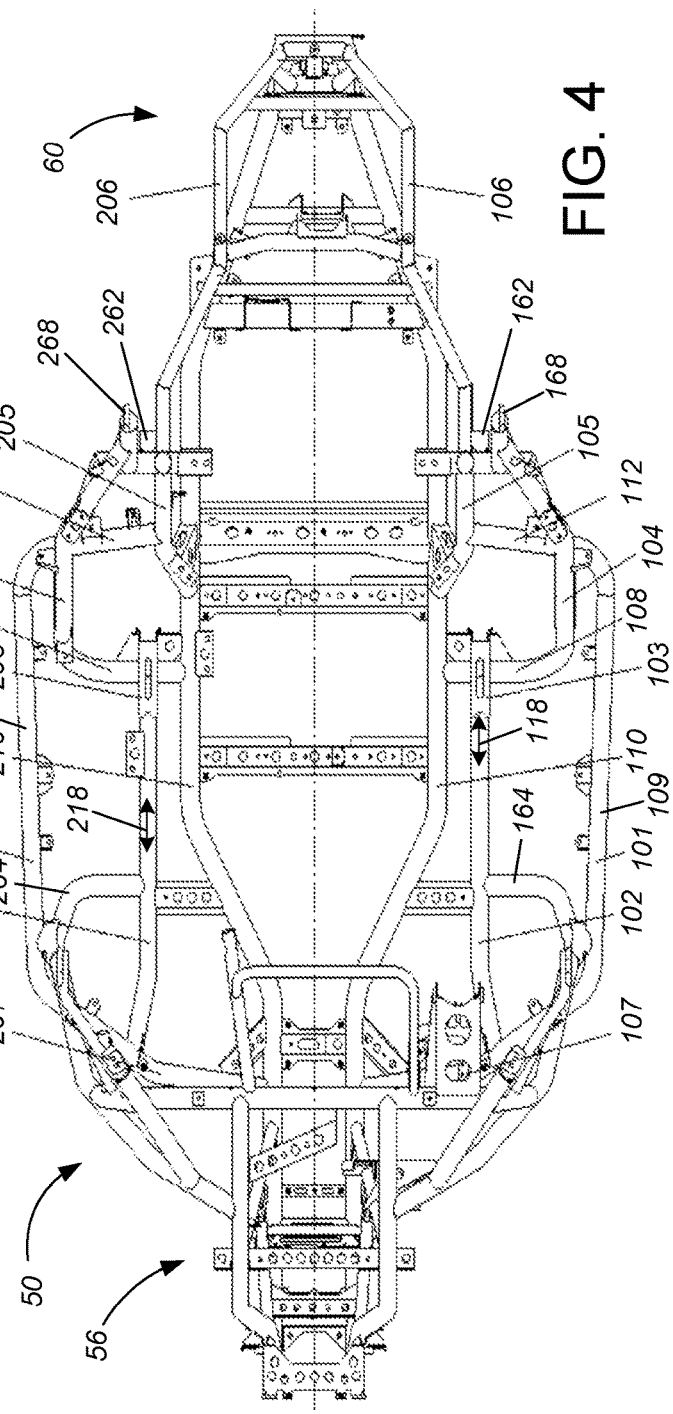
FIG. 4 is a top plan view of the frame structure of FIG. 3.
Figure 6:
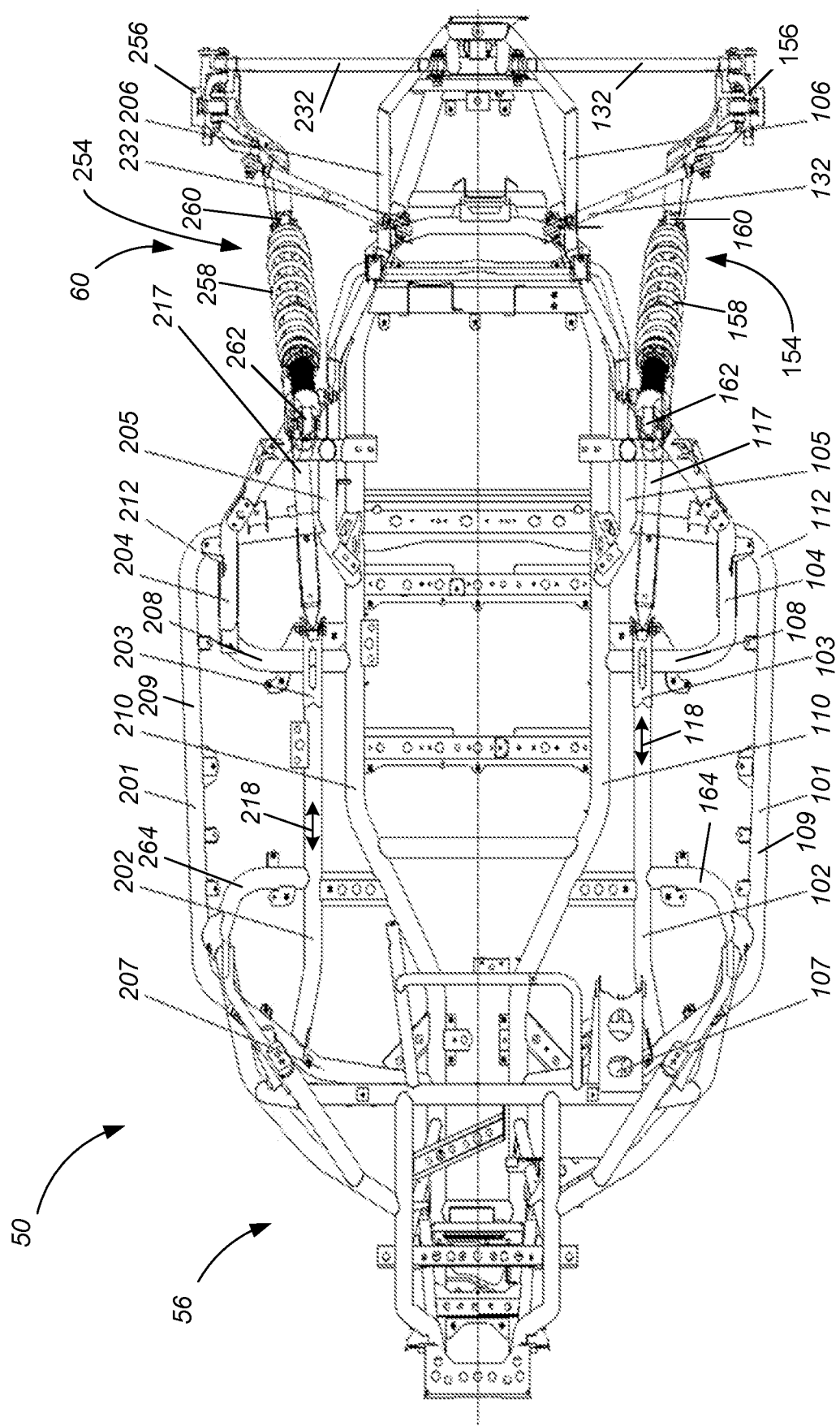
FIG. 6 is a top plan view of the frame structure and rear suspension of FIG. 5.
Figure 7:
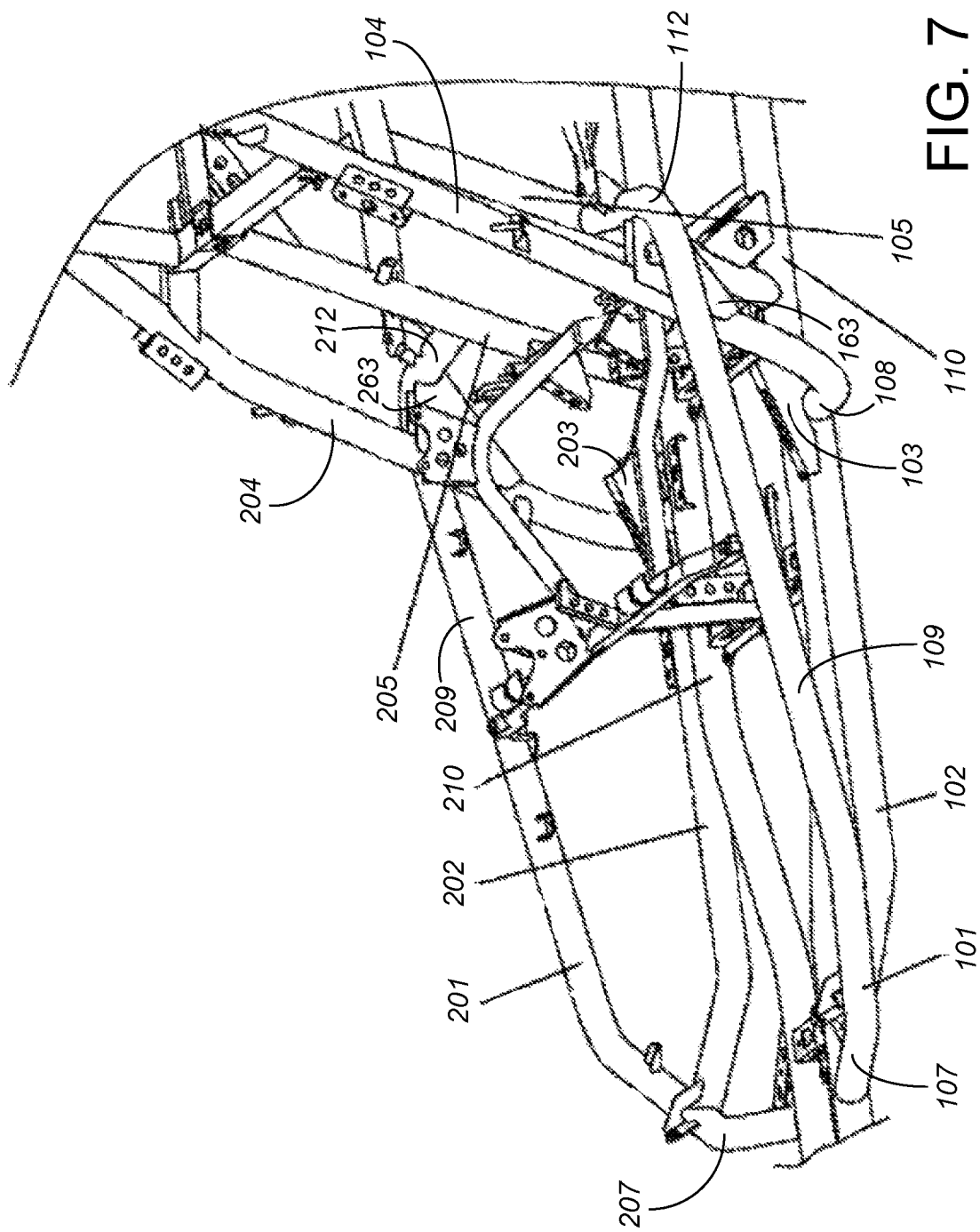
FIG. 7 is a perspective view of the occupant compartment portion of the frame structure of FIGS. 3-6, also showing the seat support portion and engine mounts, but omitting the front support columns for drawing clarity.
Figure 8:
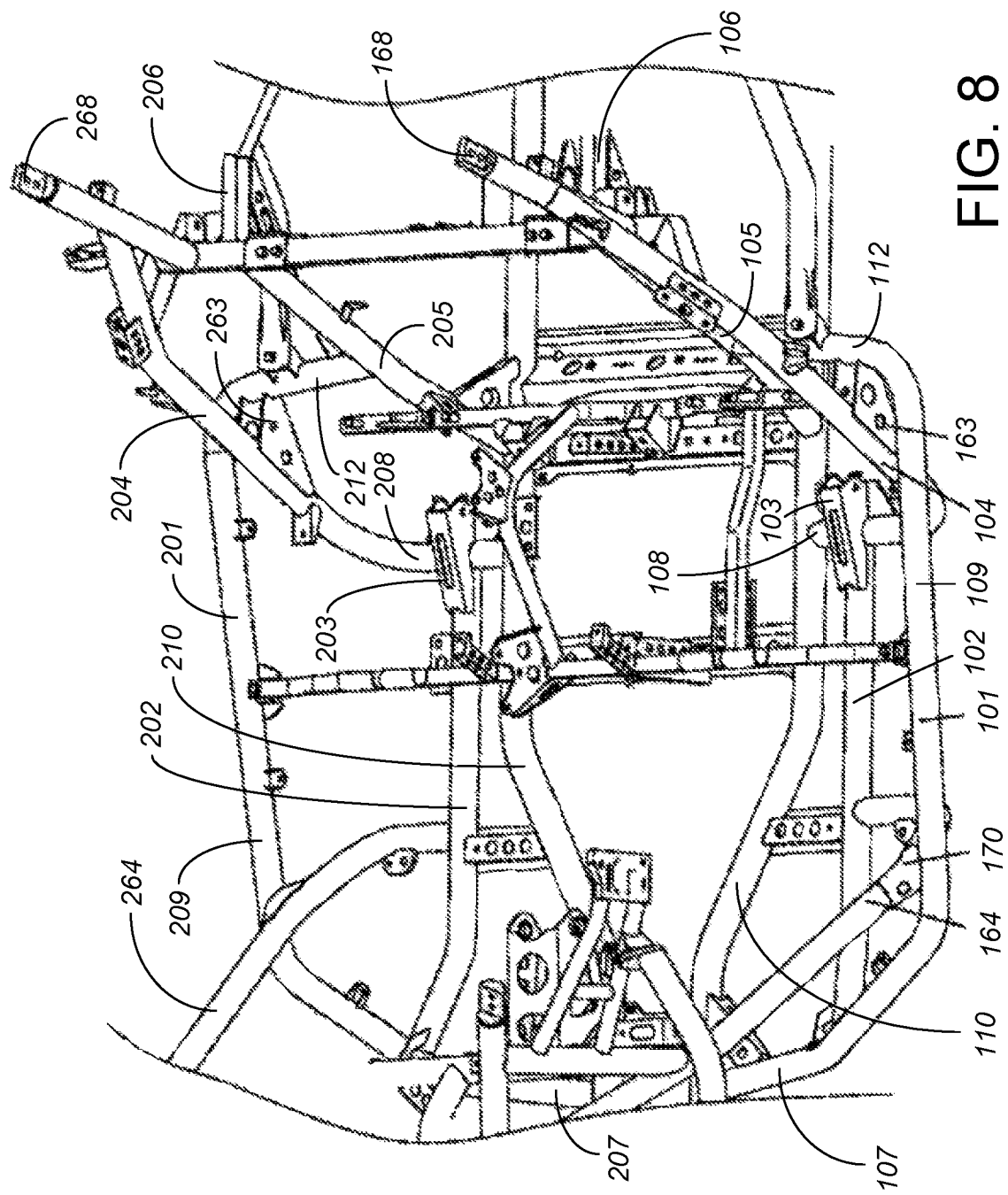
FIG. 8 is a second perspective view of the occupant compartment portion of the frame structure of FIGS. 3-6, also showing the seat support portion and engine mounts. In numbering the figures of the present invention, the 1xx series numbers denote a left side structure, while 2xx series numbers denote a right side structure, substantially having bilateral or mirror symmetry about a longitudinal bisecting plane.

As best shown in FIGS. 4 and 6, the transverse or lateral spacing between the left main beam 110 and the right main beam 210 is significantly less than in the prior art, particularly under the occupant compartment. Under the seats (not shown), the spacing between the left main beam 110 and the right main beam 210 is less than half of the width of the frame 50, in the preferred embodiment about 44% of the width of the frame 50. Under the occupants' feet, the spacing between the left main beam 110 and the right main beam 210 decreases down to even less, in the preferred embodiment about 17% of the width of the frame 50.

The narrower width between the left main beam 110 and the right main beam 210 is significant for two reasons. First, the width between the main beams 110, 210 affects how rolling moments are transferred within the frame 50. By having the left main beam 110 and the right main beam 210 closer together, less stress is placed on the cross bars or cross plates and their welded or fastened connections to the left main beam 110 and the right main beam 210. Additionally, by having the main beams 110, 210 closer together, there is room to place and appropriately position two additional longitudinally extending frame members, the left swing arm mounting beam 102 and the right swing arm mounting beam 202, further discussed below. The present invention is particularly designed and intended for use with a swing arm rear suspension 154, 254, shown in part in FIGS. 5 and 6, and further explained in U.S. patent application Ser. Nos. 15/825,662 and 15/891,622, incorporated by reference.

Like the prior art, the frame 50 includes a left longitudinal beam 101 and a right longitudinal beam 201 to define the width of the frame 50. While other cross sectional shapes and sizes are possible, including the smaller, rectangular tubing used in the prior art, the longitudinal beams 101, 201 are both preferably cylindrical metal tubing, of a diameter similar to the main beams 110, 210. Very unlike the prior art, the longitudinal beams 101, 201 are not positioned significantly within the horizontal base plane 52 along their longitudinal length, and then curved upwards at their ends to define generally vertical planes. Instead, the longitudinal beams 101, 201 are connected into the horizontal base plane 52 at their front ends 107, 207 before extending outwardly and then curving rearward to define the width of the frame 50 and provide the longitudinally extending portions 109, 209. The longitudinally extending portions 109, 209 of the longitudinal beams 101, 201 are not horizontal, but rather the rise toward the back of the vehicle. In the preferred embodiment, the rise of the longitudinal beams 101, 201 is linear, both providing good strength and aesthetic appeal. The aesthetic appeal of the longitudinally extending portions 109, 209 of the longitudinal beams 101, 102 is considered interesting enough that the longitudinally extending portions 109, 209 of the longitudinal beams 101, 102 need not be covered with body panels (not shown) in the final vehicle, but rather are preferably left exposed for viewing on the outside of the vehicle.

Figure 5:
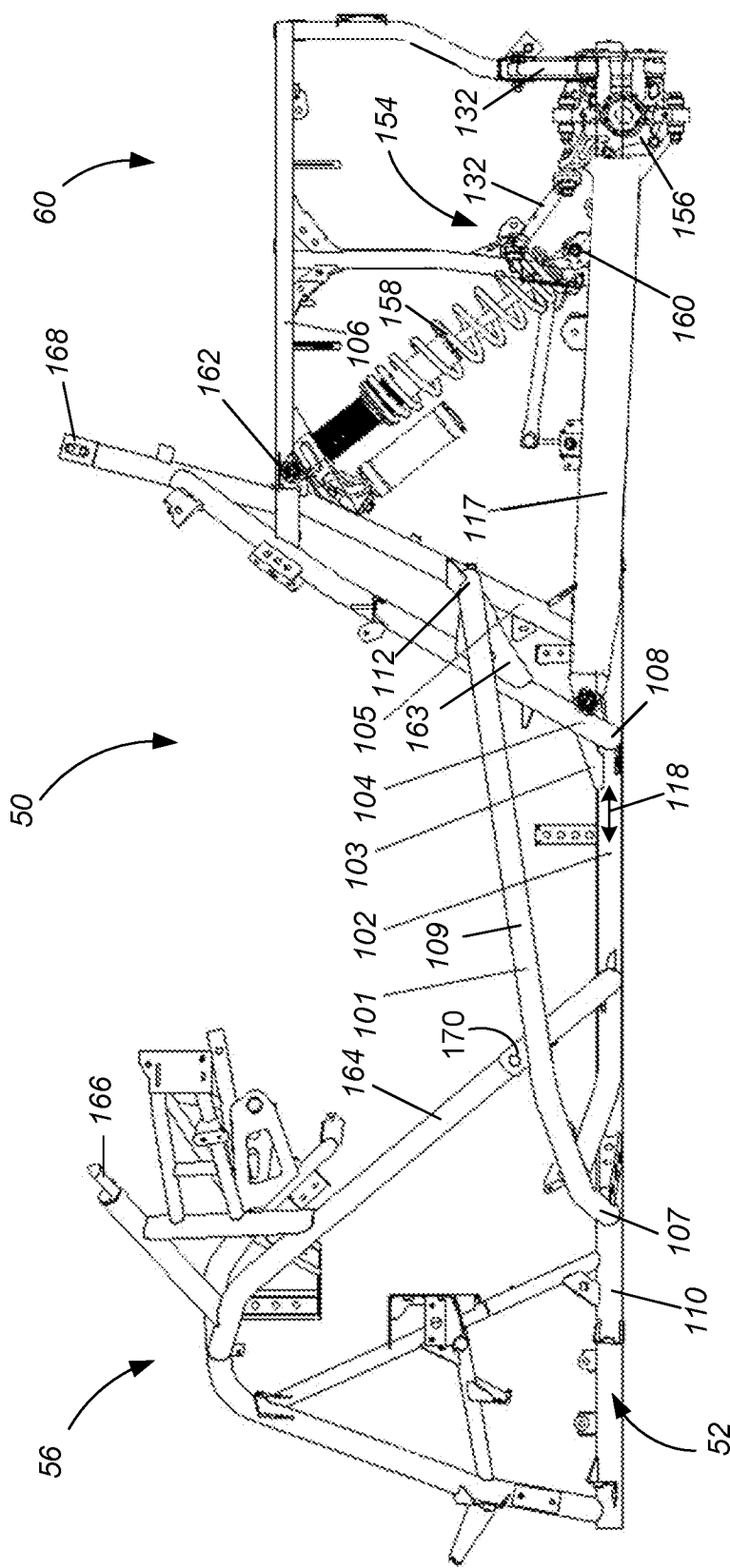
FIG. 5 is a side view of the frame structure of FIGS. 3 and 4, also showing the preferred rear suspension.

In the preferred embodiment, the rear ends 112, 212 of the longitudinal beams 101, 201 terminate just behind the seats, at an elevation nearly mid-height between the horizontal base plane 52 and the high beams 106, 206. At this location, the rear ends 112, 212 of the longitudinal beams 101, 201 curve inward. Because the rear end 112, 212 of the longitudinal beams 101, 201 is significantly higher in elevation than the horizontal base plane 52 and the main beams 110, 210, the rear end 112, 212 of each of the longitudinal beams 101, 201 is instead connected to an inner support column 105, 205 behind the seats. As best shown in FIG. 5, the high rear ends 112, 212 of the longitudinal beams 101, 201 leave significant space under the longitudinal beams 101, 201 for upward travel of rear swing suspension arms 117, 217.

Note that the longitudinal beams 101, 201, in and of themselves, are made by curving tubing while keeping that tubing generally within a single plane, just like the longitudinal beams 1 of the prior art were within a single plane. As such, the longitudinal beams 101, 201 remain easy to form from substantially linear tubing, and remain easy to maintain in stock for stacking and manufacturing. However, the longitudinal beams 101, 201 are turned during assembly of the frame 10 so their ends 107, 207, 112, 212 extend inward (rather than extending upward as the ends of the longitudinal beams 1 did in the prior art). By having the ends 107, 207, 112, 212 of the longitudinal beams 101, 201 extend inward rather than upward, several cross-beams (particularly all those that were above the base plane 52) of the prior art frame construction are omitted, making the present invention less costly and easier to manufacture with fewer joint locations.

As noted previously, the present invention adds two longitudinally extending frame members, the mounting beam 102 for the left swing arm 117 and the mounting beam 202 for the right swing arm 217. These swing arm mounting beams 102, 202 extend within the horizontal base plane 52, preferably wider than the main beams 110, 210. At their front ends, the swing arm mounting beams 102, 202 connect in to the curved front ends 107, 207 of the longitudinal beams 101, 201. At their rear ends, the mounting beams 102, 202 terminate in swing arm mounting plates 103, 203. As shown in FIGS. 5 and 6, the swing arms 117, 217 of the rear suspensions 154, 254 are pivotably mounted to the swing arm mounting plates 103, 203. Longitudinally, the swing arm mounting plates 103, 203 are entirely in front of the rear wheels, preferably in front of the rear ends 112, 212 of the longitudinal beams 101, 102. This provides significant length to the swing arms 117, 217, allowing for a greater amount of suspension travel for a lesser amount of pivoting of the swing arms 117, 217, and for the desired suspension movement profile. The desired suspension movement profile is also controlled by rear pivot or control rods 132, 232. Laterally, the swing arm mounting plates 103, 203 are entirely inside the rear wheels and the knuckles 156, 256, of the rear suspension 154, 254. The mounting beams 102, 202 can be made from the same cylindrical tube stock as the main beams 110, 210 and the longitudinal beams 101, 201, maintaining ease of tube supply, cutting and bending.

The mounting beams 102, 202 are oriented and aligned to substantially continue the line created and defined by the swing arms 117, 217. When used with the preferred rear swing arm suspension 154, 254, the primary thrust and/or drag forces of the rear wheels are directed longitudinally along the swing arms 117, 217 and then continued longitudinally along the mounting beams 102, 202 as shown by arrows 118, 218 in FIG. 6. Due to this alignment, rather than concentrating the primary rear wheel thrust and/or drag forces as twisting moments, with significant moment arms, on a limited number of frame joints, the frame configuration of the present invention better spreads the primary thrust and/or drag forces of the rear wheels along the length of the mounting beams 102, 202.

Rear shock absorbers 158, 258 are used in the rear suspension 154, 254 associated with the travel of the rear swing arms 117, 217. Preferably the rear shock absorbers 158, 258 are mounted at a slope, generally vertically aligned above the rear swing arms 117, 217, running from a rear shock lower mount location 160, 260 at a trailing end of each swing arm 117, 217 upward to a top mounting location 162, 262 on or adjacent the high beams 106, 206.

Like in the prior art, right and left outer support columns 104, 204 extend upwardly from the main beams 110, 210 and behind the occupants. Unlike the prior art, the outer support columns 104, 204 each include a laterally extending section 108, 208 within the main base plane 52. The trailing ends of the mounting beams 102, 202 are connected to these laterally extending sections 108, 208, such that the swing arm mounting plates 103, 203 are supported both by the mounting beams 101, 201 and by the laterally extending sections 108, 208 of the support columns 104, 204, at the junction between the mounting beams 101, 201 and the laterally extending sections 108, 208 of the support columns 104, 204. At an elevation above the main base plane 52, the support columns 104, 204 are joined to the longitudinal beams 101, 201, such as each with a bracket 163, 263 best shown in FIGS. 7 and 8. Alternatively, the support columns 104, 204 could be joined such as with a spot weld or other structure to support to the longitudinal beams 101, 201, or, less preferably, the longitudinal beams 101, 201 might not connect to the support columns 104, 204. The high beams 106, 206 are supported from the support columns 104, 204 and/or from the support columns 105, 205, either in a straight configuration or in a bending configuration as shown. Behind the support columns 104, 204, the remainder of the rear section 60 of the frame 50 can be constructed in a wide variety of ways similar to the prior art, and is not particularly significant to the present invention.

Like in the prior art, there is a front section 56 of the frame 50 higher than the horizontal base plane 52, including front columns 164, 264 extending upwardly. However, instead of having the front support columns 164, 264 extending upwardly from the longitudinal beams, the preferred frame 50 has the front support columns 164, 264 extending from the mounting beams, first laterally outwardly and then upwardly. In this arrangement, the front support columns 164, 264 can be attached both to the mounting beams 102, 202 and to the longitudinal beams 101, 201. Preferably the front support columns 164, 264 are attached to the longitudinal beams 101, 201 at an elevation above the main base plane 52, such as by including an indentation 170 (shown in FIGS. 3, 5 and 8) for spot welding. Alternatively, the front support columns 164, 264 could include a bracket (not shown) or other structure to support to the longitudinal beams 101, 201, or, less preferably, the longitudinal beams 101, 201 might not connect to the front support columns 164, 264. The remainder of the front section 56 of the frame 50 can be constructed in a wide variety of ways similar to the prior art, and is not particularly significant to the present invention.

Each of the front support columns 164, 264, the outer support columns 104, 204 and the inner support columns 105, 205 can be made from the same cylindrical tube stock as the main beams 110, 210, the longitudinal beams 101, 201 and the mounting beams 102, 202, maintaining ease of tube supply, cutting and bending. Attachment locations 166, 266, 168, 268 for the roll cage are provided from the front section 56 and the rear section 60 of the frame 50.

The frame 50 of the present invention is simple and contains a limited number of parts, while simplifying its attachment to the rear suspension 154 and reducing requirements for welding precision. The frame 50 allows for unimpeded movement of the rear suspension swing arms 117, 217, so the rear wheels can obtain greater dynamic travel. The space for the rear wheel becomes wider and the parts are more conveniently arranged for assembly and welding.

Although the present invention has been described with reference to preferred embodiments, workers skilled in the art will recognize that changes may be made in form and detail without departing from the spirit and scope of the invention

The invention claimed is:

1. A frame for an off road vehicle, comprising:
at least one main beam running in a generally longitudinal direction and establishing a base plane for the frame;
right and left support posts extending upwardly from the at least one main beam behind a space for seating at least one vehicle occupant;
right and left longitudinal beams running longitudinally outside the at least one main beam and having longitudinal sections defining a frame width, the right longitudinal beam having a trailing end connecting into the right support post at an elevation above the base plane, the left longitudinal beam having a trailing end connecting into the left support post at an elevation above the base plane; and
right and left mounting beams each running longitudinally outside the at least one main beam and being closer together than the longitudinal sections of the right and left longitudinal beams, the right mounting beam having a trailing end adapted to connect in line with a right swing arm of a swing arm suspension at an elevation lower than the trailing end of the right longitudinal beam, the left mounting beam having a trailing end adapted to connect in line with a left swing arm of a swing arm suspension at an elevation lower than the trailing end of the right longitudinal beam.

2. The frame of claim 1, wherein the at least one main beam comprises right and left main beams.

3. The frame of claim 2, wherein spacing between the left main beam and the right main beam is less than half of the frame width.

4. The frame of claim 3, wherein the right mounting beam is transversely spaced from the right main beam, and wherein the left mounting beam is transversely spaced from the left main beam.

5. The frame of claim 4, wherein the frame further comprises:
a right bracket at the trailing end of the right mounting beam for pivotally receiving the right swing arm; and
a left bracket at the trailing end of the left mounting beam for pivotally receiving the left swing arm.

6. The frame of claim 5, further comprising:
a right outer support column extending from outwardly from the right main beam and then upwardly, wherein the right outer support column connects to the right mounting beam within the base plane, the right outer support column supporting the right longitudinal beam at an elevation above the base plane, wherein the right outer support column provides a right rear connection for a roll over protection system;
a left outer support column extending from upwardly from the left main beam and then upwardly, wherein the left outer support column connects to the left mounting beam within the base plane, the left outer support column supporting the left longitudinal beam at an elevation above the base plane, wherein the left outer support column provides a left rear connection for the roll over protection system;
a rear section of the frame higher than the base plane, wherein the rear section comprises:
a right horizontal longitudinally extending high beam;
a right rear shock absorber upper connection point at or adjacent the right high beam;
a left horizontal longitudinally extending high beam; and
a left rear shock absorber upper connection point at or adjacent the left high beam; and
a front section higher than the base plane, wherein the front section comprises:
a right front column extending upwardly from the right mounting beam; and
a left front column extending upwardly from the left mounting beam;
wherein the right and left mounting beams each run longitudinally within the base plane;
wherein the right longitudinal beam has a leading end connecting in to the right main beam within the base plane, and
wherein the left longitudinal beam has a leading end connecting in to the left main beam within the base plane.

7. The frame of claim 1, wherein the right and left mounting beams each run longitudinally within the base plane.

8. The frame of claim 1, wherein the right longitudinal beam has a leading end connecting in to the at least one main beam within the base plane, and wherein the left longitudinal beam has a leading end connecting in to the at least one main beam within the base plane.

9. The frame of claim 1, further comprising right and left outer support columns extending upwardly from the at least one main beam, the outer support columns supporting the longitudinal beams at an elevation above the base plane.

10. The frame of claim 9, wherein the right and left outer support columns extending outwardly from the at least one main beam within the base plane before extending upwardly, and wherein the right outer support column connects to the right mounting beam within the base plane, and wherein the left outer support column connects to the left mounting beam within the base plane.

11. The frame of claim 9, wherein the right and left outer support columns provide rear connections for a roll over protection system.

12. The frame of claim 1, further comprising a rear section of the frame higher than the base plane, wherein the rear section includes right and left horizontal longitudinally extending high beams.

13. The frame of claim 12, wherein the frame further comprises:
a right rear shock absorber upper connection point at or adjacent the right high beam; and
a left rear shock absorber upper connection point at or adjacent the left high beam.

14. The frame of claim 1, wherein the frame further comprises a front section higher than the base plane that includes at least one front column.

15. The frame of claim 14, wherein the at least one front column comprises:
a right front column extending upwardly from the right mounting beam; and
a left front column extending upwardly from the left mounting beam.

16. A frame for an off road vehicle, comprising:
right and left main beams running in a generally longitudinal direction and establishing a base plane for the frame;

a right support post extending upwardly from the right main beam behind a space for seating at least one vehicle occupant;

a left support post extending upwardly from the right main beam behind the space for seating a right longitudinal beam, running outwardly from the right main beam within the base plane, and then turning rearwardly to run longitudinally, and then turning inwardly before connecting into the right support post at an elevation above the base plane;

a left longitudinal beam, running outwardly from the right main beam within the base plane, and then turning rearwardly to run longitudinally, and then turning inwardly before connecting into the left support post at an elevation above the base plane, wherein longitudinal sections of the right longitudinal beam and the left longitudinal beam define a frame width;

a right outer support column extending from outwardly from the right main beam and then upwardly, the right outer support column supporting the right longitudinal beam at an elevation above the base plane; and a left outer support column extending from upwardly from the left main beam and then upwardly, the left outer support column supporting the left longitudinal beam at an elevation above the base plane.

17. The frame of claim 16, wherein the longitudinal sections of the right and left longitudinal beams rise linearly from front to back and are left visibly exposed on an outside of the off road vehicle.

18. The frame of claim 16, wherein spacing between the left main beam and the right main beam is less than half of the frame width.

19. An off road vehicle, comprising:
a frame comprising:
  at least one main beam running in a generally longitudinal direction and establishing a base plane for the frame;
  right and left support posts extending upwardly from the at least one main beam behind a space for seating at least one vehicle occupant;
  right and left mounting beams each running longitudinally outside the at least one main beam within the base plane;
a rear swing arm suspension comprising:
  a right swing arm connected in line with the right mounting beam;
  a right shock absorber extending upwardly from the right swing arm toward the right support post;
  a left swing arm connected in line with the left mounting beam;
  a left shock absorber extending upwardly from the left swing arm toward the left support post.

20. The off-road vehicle of claim 19, further comprising:
right and left longitudinal beams running longitudinally and having longitudinal sections defining a frame width;
wherein the right mounting beam is laterally spaced from the right main beam;
wherein the longitudinal section of the right longitudinal beam is laterally spaced from the right mounting beam;
wherein the left mounting beam is laterally spaced from the left main beam; and
wherein the longitudinal section of the left longitudinal beam is laterally spaced from the left mounting beam.

\* \* \* \* \*